US005099734A

United States Patent [19]

Sugiyama et al.

[11] Patent Number: 5,099,734

[45] Date of Patent: Mar. 31, 1992

[54] SLITTING WIDTH CHANGING SYSTEM FOR SLITTER

[75] Inventors: Katuhiro Sugiyama; Yoshio Nojima; Kunihiro Sumida; Shigehisa Shimizu, all of Kanagawa, Japan

[73] Assignee: Fuji Photo Film Co., Ltd., Kanagawa, Japan

[21] Appl. No.: 660,073

[22] Filed: Feb. 25, 1991

[30] Foreign Application Priority Data

Feb. 26, 1990 [JP] Japan .................................. 2-45034

[51] Int. Cl.[5] ......................... B23D 19/04; B26D 7/26

[52] U.S. Cl. ..................................... 83/498; 83/425.4; 83/499; 83/504; 83/508.2

[58] Field of Search ................. 83/498, 499, 500, 504, 83/508.2, 508.3, 425.4

[56] References Cited

U.S. PATENT DOCUMENTS

| | | | |
|---|---|---|---|
| 3,041,907 | 7/1962 | Gallagher, Jr. | 83/504 X |
| 3,411,392 | 11/1968 | Spangler | 83/498 X |
| 3,837,265 | 9/1974 | Tokuno | 83/498 X |
| 4,269,097 | 5/1981 | Linn | 83/482 |
| 4,506,577 | 3/1985 | Shinomiya et al. | 83/499 |
| 4,962,684 | 10/1990 | Mowry | 83/508.2 X |

FOREIGN PATENT DOCUMENTS

| | | |
|---|---|---|
| 0058629 | 8/1982 | European Pat. Off. . |
| 1042309 | 10/1958 | Fed. Rep. of Germany . |
| 62-50276 | 10/1987 | Japan . |
| 63-134193 | 6/1988 | Japan . |
| 1059760 | 2/1967 | United Kingdom . |

*Primary Examiner*—Frank T. Yost
*Assistant Examiner*—Eugenia A. Jones
*Attorney, Agent, or Firm*—Sughrue, Mion, Zinn, Macpeak & Seas

[57] ABSTRACT

A slitter slits a wide web into narrow strips by at least one slitting blade mounted on a shaft member which extends in the transverse direction of the wide web while the wide web is fed in the longitudinal direction thereof. The slitter is provided with a slitting width changing system which has a slitting blade holder which holds the slitting blade and is fitted on the shaft member to be rotatable about the shaft member between a released position in which it can be slid along the shaft member in the longitudinal direction of the shaft member and a locked position in which it is fixed to the shaft member not to slide along the shaft member. A slitting blade shift mechanism rotates the slitting blade holder to the released position, slides it along the shaft member to a position determined according to a desired slitting width, and rotates it to the locked position.

3 Claims, 5 Drawing Sheets

SLITTING WIDTH CHANGING SYSTEM FOR SLITTER

BACKGROUND OF THE INVENTION

1. Field of the Invention

This invention relates to a slitter for slitting a wide web into narrow strips, and more particularly to a slitting width changing system for changing the slitting width (or the widths of the strips slit from the wide web) in such a slitter.

2. Description of the Prior Art

In a slitter for slitting a wide web into narrow strips, generally, the wide web is fed in the longitudinal direction thereof and is slit by a slitting blade or slitting blades mounted on a shaft which extends in the transverse direction of the wide web. Conventionally, change of the slitting width has been manually performed. Recently, there has been proposed a slitting width changing system for automatically changing the slitting width in such a slitter as disclosed, for instance, in Japanese Patent Publication No. 62(1987)50276 and Japanese Unexamined Patent Publication No. 63(1988)-134193.

In any one of the slitting width changing system disclosed in the patent publications, each slitting blade is held by a slitting blade holder which is mounted on the shaft so that it can be locked on and released from the shaft, and the slitting width is changed by releasing the slitting blade holder from the shaft, shifting it along the shaft and then locking it again on the shaft. However, since in the slitting width changing system, locking and releasing of the slitting blade holder are effected by rotating the shaft, it is very difficult to control the locking torque. When the locking torque is excessively large, the outer surface of the shaft can be scratched, which can prevent the slitting blade holder from being shifted along the shaft. On the other hand, when the locking torque is too small, the slitting blade holder cannot be firmly held in place.

SUMMARY OF THE INVENTION

In view of the foregoing observations and description, the primary object of the present invention is to provide a slitting width changing system in which the slitting blade holder can be locked on the shaft with a proper locking force and can be firmly held in place.

The slitting width changing system in accordance with the present invention is characterized in that the slitting blade holder is arranged so that it can be locked on and released from the shaft by rotating the holder itself relative to the shaft.

That is, in accordance with the present invention, there is provided a slitting width changing system for a slitter in which a wide web is slit into narrow strips by at least one slitting blade mounted on a shaft member which extends in the transverse direction of the wide web while the wide web is fed in the longitudinal direction thereof, said slitting width changing system comprising a slitting blade holder which holds said slitting blade and is fitted on said shaft member to be rotatable about the shaft member between a released position in which it can be slid along the shaft member in the longitudinal direction of the shaft member and a locked position in which it is fixed to the shaft member not to slide along the shaft member, and a slitting blade shift mechanism which rotates the slitting blade holder to the released position, moves it to a position determined according to a desired slitting width, and rotates it to the locked position.

When the slitting blade holder is locked on the shaft member by rotating the slitting blade holder relative to the shaft member, the locking torque can be more easily controlled than when the slitting blade holder is locked on the shaft member by rotating the shaft member relative to the slitting blade holder.

DESCRIPTION OF THE PREFERRED EMBODIMENT

Figure 1:
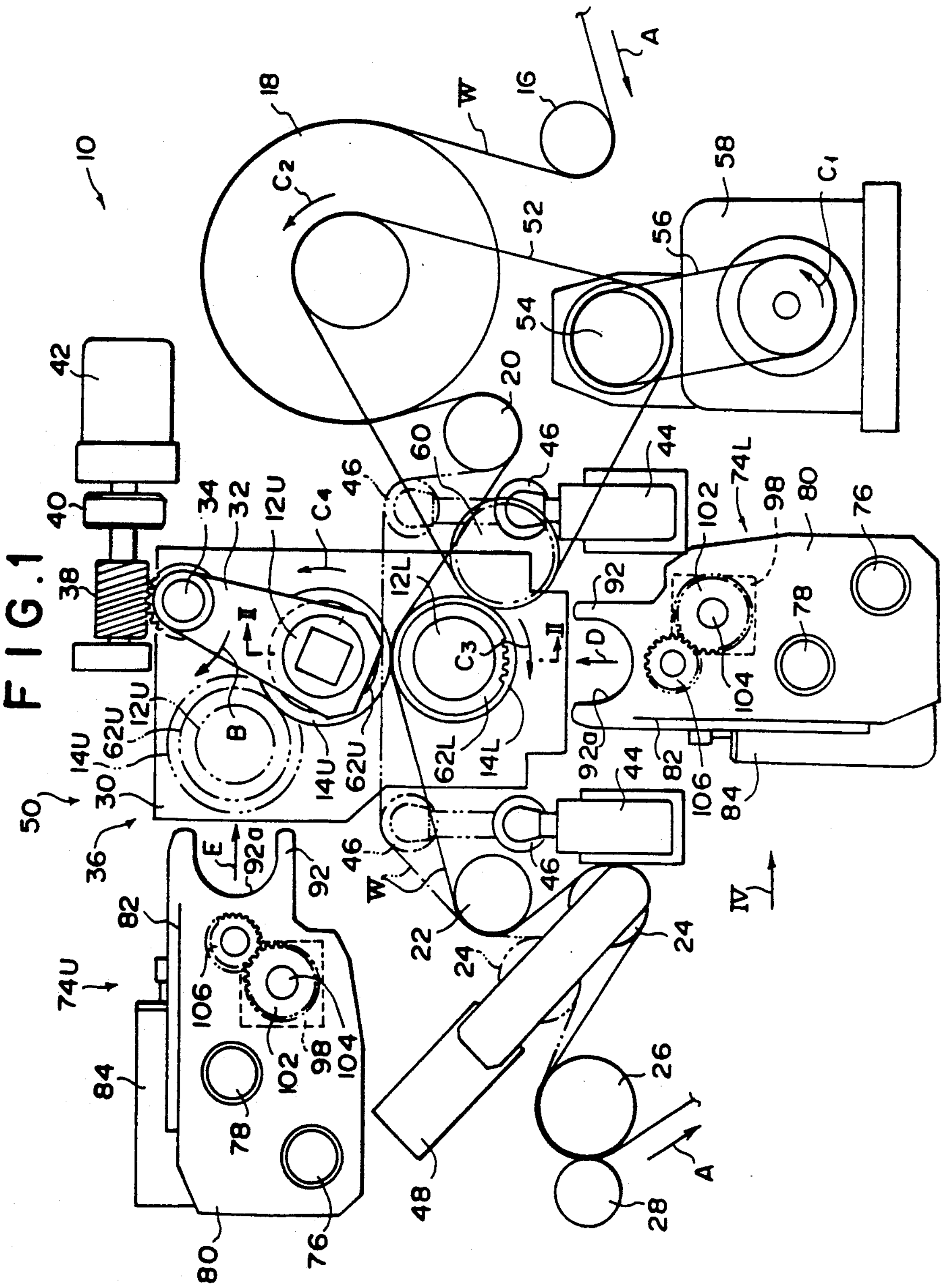
FIG. 1 is a front view of a slitter provided with a slitting width changing system in accordance with an embodiment of the present invention.

In FIG. 1, a slitter 10 slits a wide strip-like web W into narrow strips with a plurality of upper slitting blades 14U and a plurality of lower slitting blades 14L while feeding the wide strip-like web W in the direction of arrow A (the longitudinal direction of the web). The upper slitting blades 14U are supported on an upper shaft 12U which extends substantially in the transverse direction of the wide strip-like web W and the lower slitting blades 14L are supported on a lower shaft 12L which extends substantially in the transverse direction of the wide strip-like web W.

The wide strip-like web W is fed along a pass roller 16, a suction drum 18, pass rollers 20 and 22, a tension roller 24, a feed roller 26 and a nip roller 28. The lower shaft 12L is disposed substantially midway between the pass rollers 20 and 22 and slightly higher than the pass rollers 20 and 22. The upper shaft 12U is positioned slightly higher than the lower shaft 12L as clearly shown in FIG. 2. Each end of the lower shaft 12L is supported on a support plate 30, and each end of the upper shaft 12U is supported on the support plate 30 by way of a bracket 32 and a rotary shaft 34. The upper and lower slitting blades 14U and 14L, the upper and lower shafts 12U and 12L, the support plate 30, the brackets 32 and the rotary shafts 34 are incorporated into a slitting blade unit 36. The rotary shaft 34 is connected to an upper shaft swinging motor 42 by way of a worm gear 38 and a clutch brake 40 so that upper shaft 12U can be driven by the motor 42 to the position shown by the chained line in FIG. 1 in the direction of arrow B.

A pair of web release rollers 46 are respectively provided between the lower shaft 12L and the pass roller 20 and between the lower shaft 12L and the pass roller 22. The web release rollers 46 can be lifted to the positions shown by the chained lines by a pair of web release cylinders 44. When the web release rollers 46 are lifted, the tension roller 24 is retracted to the position shown by the chained line by a tensing cylinder 48.

The suction drum 18 is connected to a web feed motor 58 by way of a belt 52, a reduction train 54 and a belt 56, and is rotated in the direction of arrow C2 when the motor 58 rotates in the direction of arrow Cl and feeds the wide strip-like web W. The belt 52 is also passed around a pulley 60 disposed ad]jact to the lower shaft 12L, and when the pulley 60 is rotated, the lower and upper shafts 12L and 12U are respectively rotated in the directions of arrows C3 and C4 at a speed corresponding to the feed speed of the wide strip-like web W.

Figure 2:
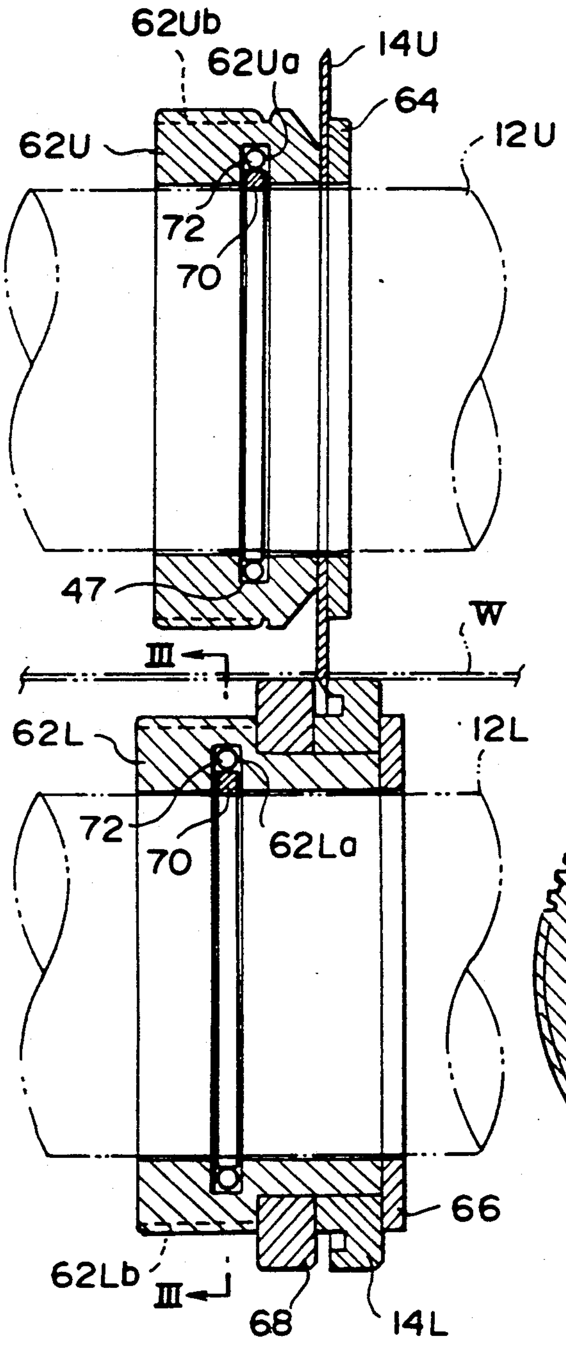
FIG. 2 is a cross-sectional view taken along line II—II in FIG. 1.

As shown in FIG. 2, the upper and lower slitting blades 14U and 14L are respectively carried by upper and lower slitting blade holders 62U and 62L which are substantially cylindrical and loosely fitted on the upper and lower shafts 12U and 12L, respectively. The upper slitting blade 14U is fixed to the upper slitting blade holder 62U by a mounting plate 64, and the lower slitting blade 14L is fixed to the lower slitting blade holder 62L by a mounting plate 66 and a collar 68 which is substantially equal in outer diameter to the lower slitting blade 14L, with the lower slitting blade 14L sandwiched between the collar 68 and the mounting plate 66. An eccentric groove 62La is formed in the inner peripheral surface of the lower slitting blade holder 62L, and an eccentric ring 70 is fitted in the eccentric groove 62La with a number of balls 72 interposed therebetween as better shown in FIG. 3. The eccentric ring 70 has an inner diameter slightly larger than the outer diameter of the lower shaft 12L and has a slit 72*a* at a portion at which the radial thickness thereof is minimum.

Figure 3:
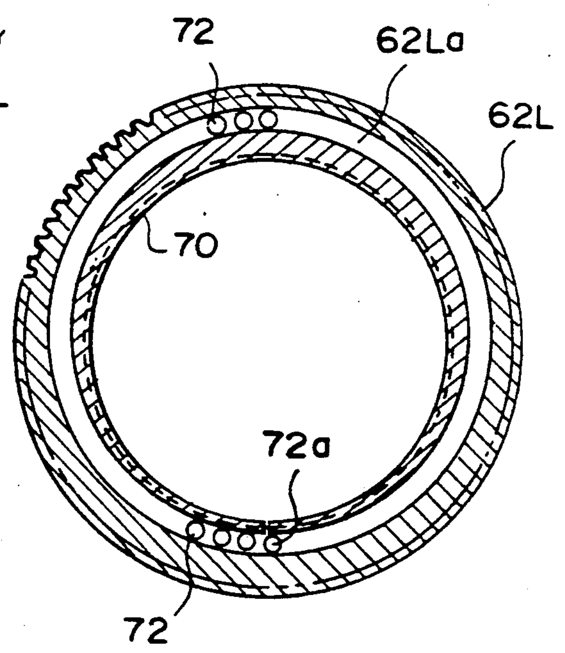
FIG. 3 is a cross-sectional view taken along line III—III in FIG. 2.

When the eccentric ring 70 and the lower slitting blade holder 62L are positioned relative to each other so that the space between the outer peripheral surface of the eccentric ring 70 and the bottom surface of the eccentric groove 62La of the lower slitting blade holder 62L is substantially uniform over the entire circumference as shown in FIG. 3, there is produced no stress. However, when the eccentric ring 70 and the lower slitting blade holder 62L are rotated relative to each other from the position shown in FIG. 3, and the space between the outer peripheral surface of the eccentric ring 70 and the bottom surface of the eccentric groove 62La of the lower slitting blade holder 62L becomes non-uniform, the eccentric ring 70 is pushed inward and displaced inward by the lower slitting blade holder 62L by way of the balls 72 at a portion at which the space therebetween is smaller.

That is, when the eccentric ring 70 and the lower slitting blade holder 62L are in the position shown in FIG. 3, no load acts on the lower shaft 12L from the eccentric ring 70, and accordingly, the lower slitting blade holder 62L is able to slide along the lower shaft 12L in the longitudinal direction thereof and to rotate about the lower shaft 12L. However, when the lower slitting blade holder 62L is rotated relative to the eccentric ring 70 by a predetermined amount, the eccentric ring 70 is pressed against the lower shaft 12L and the lower slitting blade holder 62L is locked to the lower shaft 12L.

Also, the upper slitting blade holder 62U is provided with an eccentric groove 62Ua and is locked to the upper shaft 12U by way of an eccentric ring 70 and balls 72 in the similar manner. Teeth 62Ub and teeth 62Lb are respectively formed on the peripheral surfaces of the upper and lower slitting blade holders 62U and 62L over the entire circumferences thereof. The teeth 62Ub and the teeth 62Lb are adapted to engage respectively with gears in upper and lower slitting blade shift mechanisms 74U and 74L which will be described later.

Although, in FIG. 2, the upper and lower slitting blade holders 62U and 62L are illustrated in the state where they are released from the upper and lower shafts 12U and 12L, that is, they can slide and rotate with respect to the shafts 12U and 12L for the purpose of simplicity of description, they are, in fact, in the state where they are locked to the shafts 12U and 12L when they are in the position shown in FIG. 1.

As shown in FIG. 1, the lower slitting blade shift mechanism 74L which shifts the lower slitting blades 14L along the lower shaft 12L is provided below the lower shaft 12L, and the upper slitting blade shift mechanism 74U which shifts the upper slitting blades 14U along the upper shaft 12U at a position in which it is opposed to the upper shaft 12U when the upper shaft 12U is moved to the position shown by the chained line. The upper and lower slitting blade shift mechanisms 74U and 74L are moved toward the upper and lower shafts 12U and 12L (respectively in the directions of arrow D and E) at predetermined timings when they shift the slitting blades 14U and 14L. Since the upper and lower slitting blade shift mechanisms 74U and 74L are of the same structure, only the lower slitting blade shift mechanism 74L will be described, hereinbelow.

Figure 4:
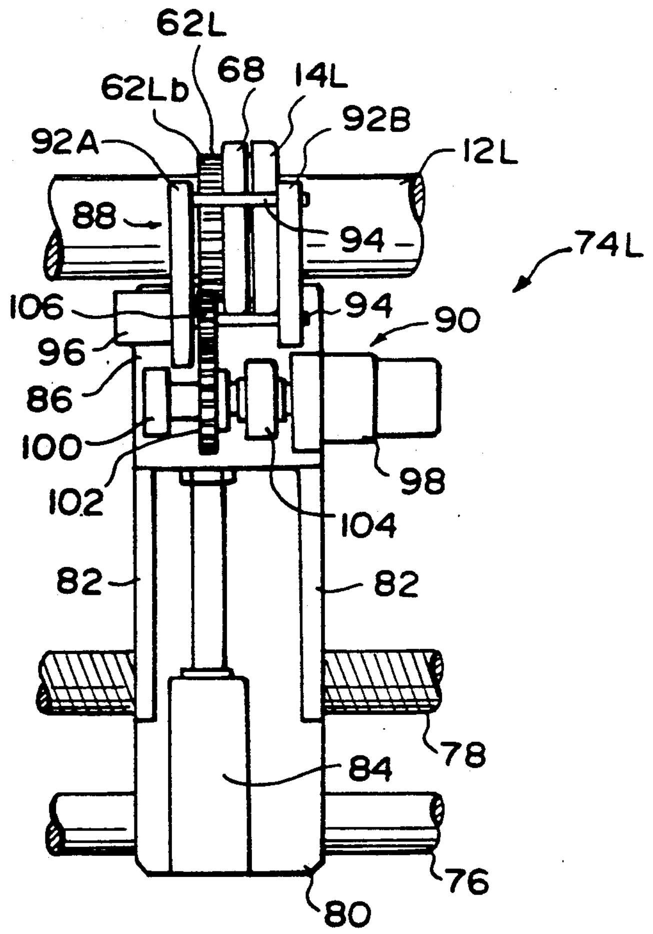
FIG. 4 is a view as viewed in the direction of arrow IV in FIG. 1.

The lower slitting blade shift mechanism 74L comprises, as shown in FIGS. 1 and 4, a carrier 80 which is supported on a guide rod 76 and a lead screw 78 extending substantially in parallel to the lower shaft 12L and is moved in the longitudinal direction of the lower shaft 12L in response to rotation of the lead screw 78, a slider 86 which is supported by the carrier 80 by way of a pair of guide rails 82 and is moved up and down by a cylinder mechanism 84, a clamp mechanism 88 supported on the slider 86 and a lower slitting blade holder rotating mechanism 90.

The clamp mechanism 88 has a pair of clampers 92A and 92B, each having a U-shaped recess 92a in the upper end portion, a plurality of guide pins 94, and a clamping motor 96 which rotates one of the guide pins 94. The clamper 92A is fixed to the slider 86 and the clamper 92B is moved toward or away from the clamper 92A in the longitudinal direction of the lower shaft 12L driven by the clamping motor 96. That is, when the clampers 92A and 92B are positioned on opposite sides of the lower slitting blade holder 62L and then clamping motor 96 is energized, the clamper 92B is moved toward the clamper 92A and the lower slitting blade holder 62L is held between the clampers 92A and 92B.

The lower slitting blade holder rotating mechanism 90 comprises a holder releasing/locking motor 98 and a bearing 100 which are supported on the slider 86, a gear 102 supported on the bearing 100, a powder clutch 104 interposed between the gear 102 and the output shaft of the motor 98, and a gear 106 which is supported for rotation on the clamper 92A and is in mesh with the gear 102. The gear 106 is brought into mesh with the teeth 62Lb on the lower slitting blade holder 62L when the slider 86 is moved to the upper mode position.

The lead screw 78 is connected to the carrier 80 by way of a ball screw and is rotated by a slitting blade shift motor (not shown). When the lead screw 78 is rotated, the carrier 80 is slid along the guide rod 76 in parallel to the lower shaft 12L.

Figure 5:
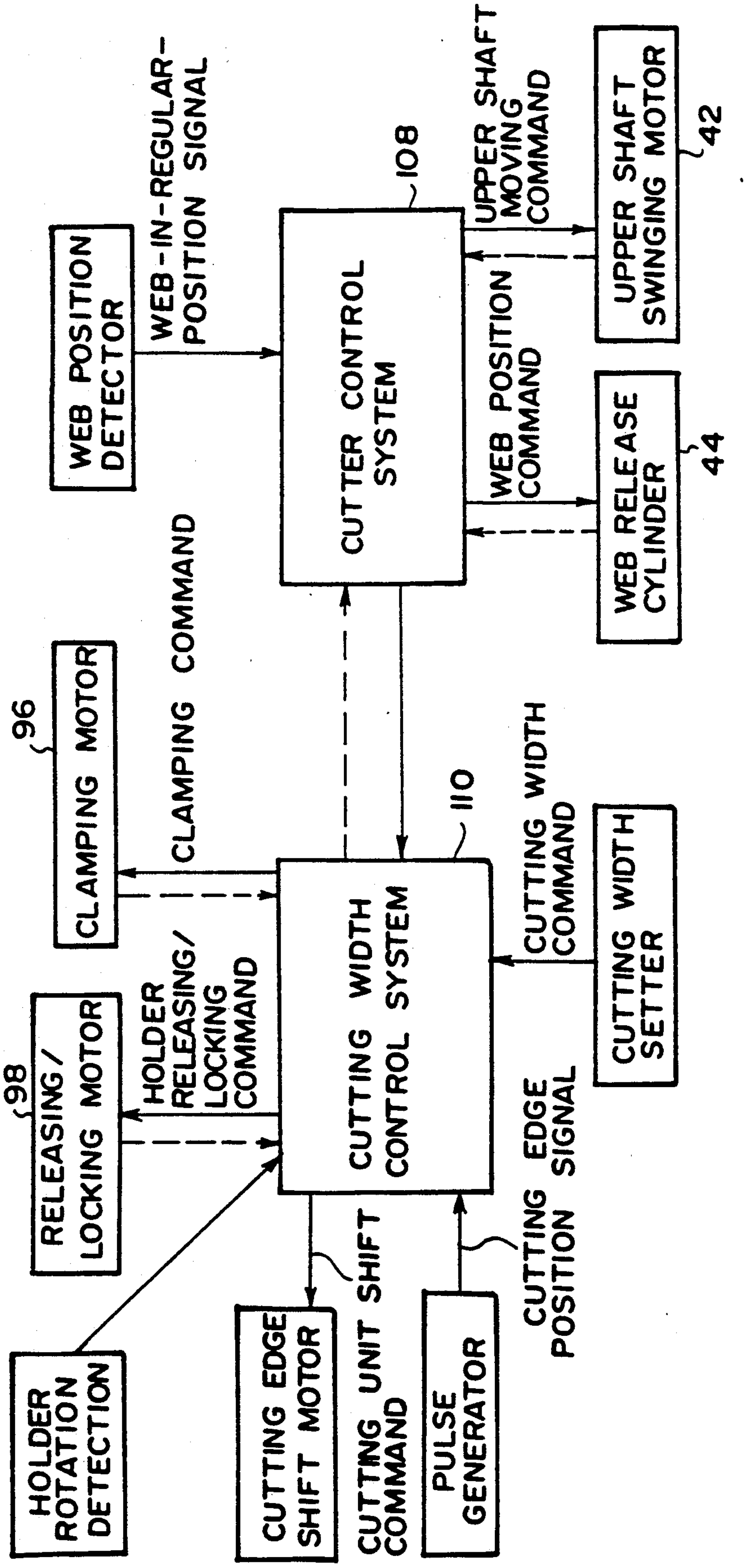
FIG. 5 is a block diagram showing the control system of the slitter shown in FIG. 1.

The motors and the cylinders in the slitter 10 are controlled, as shown in FIG. 5, by a slitter control system 108 for controlling the slitter 10 itself and a slitting width control system 110 for controlling the change of the slitting width. The slitting width control system 110, the slitting blade unit 36, and the upper and lower slitting blade shift mechanisms 74U and 74L form the slitting width changing system of this embodiment.

The operation of the slitting width changing system of this embodiment will be described, hereinbelow.

With reference to FIG. 1, when a web detector (not shown) detects that the wide strip-like web W is in a position where the slitting width of the wide strip-like web W is to be changed, the upper shaft swinging motor 42 operates to swing the upper shaft 12U to the position shown by the chained line. Then the web release cylinders 44 and the tensing cylinder 48 operate to move the wide strip-like web W to the position shown by the chained line. Thereafter the rotation of the upper and lower shafts 12U and 12L is stopped and the shafts 12U and 12L are fixed.

Then the carriers 80 of the upper and lower slitting blade shift mechanisms 74U and 74L are moved to the positions where they are respectively opposed to the upper slitting blade holder 62U and the lower slitting blade holder 62L, and the sliders 86 are moved in the directions of arrows E and D, whereby gears 106 are brought into mesh with the teeth 62Ub and 62Lb of the upper and lower slitting blade holders 62U and 62L. In this state, the clamping motors 96 are energized and the upper and lower slitting blade holders 62U and 62L are held by the clampers 92A and 92B. Thereafter, the holder releasing/locking motors 98 rotate the upper and lower slitting blade holders 62U and 62L relative to the upper and lower shafts 12U and 12L, and releases the holders 62U and 62L from the shafts 12U and 12L. In order to reduce friction produced between the holders and the clampers 92A and 92B when the holders 62U and 62L are rotated, a plurality of rollers are provided on the inner surface of each clamper though not shown.

Then the slitting blade shift motors (not shown) rotate to move the carriers 80 respectively in the longitudinal directions of the upper and lower shafts 12U and 12L by a predetermined distance. Though not shown, pulse generators provided on the lead screws 78 detect that the carriers 80 have been moved by the predetermined distance. Thereafter, the holder releasing/locking motors 98 rotates in the reverse direction to lock the holders 62U and 62L respectively on the upper and lower shafts 12U and 12L. The powder clutches 104 limit the tightening torques for the respective holders to preset torques. The preset torques for tightening the holder 62U and 62L are set smaller than the preset torques for releasing the same. Abnormality in releasing or locking the holders may be detected through rotations on opposite sides of each powder clutch 104.

After the holder 62U and 62L are locked on the upper and lower shafts 12U and 12L, the clamping motors 96 rotate in the reverse direction and the clampers 92A and 92B release the holders 62U and 62L, and then the sliders 86 are moved in the directions opposite to the directions of arrows D and E.

Thus a pair of slitting blades 14U and 14L are shifted, and other pairs of slitting blades are shifted in the similar manner if necessary so that a desired slitting width, i.e., a desired slitting blade to slitting blade distance, is obtained.

Figure 6:
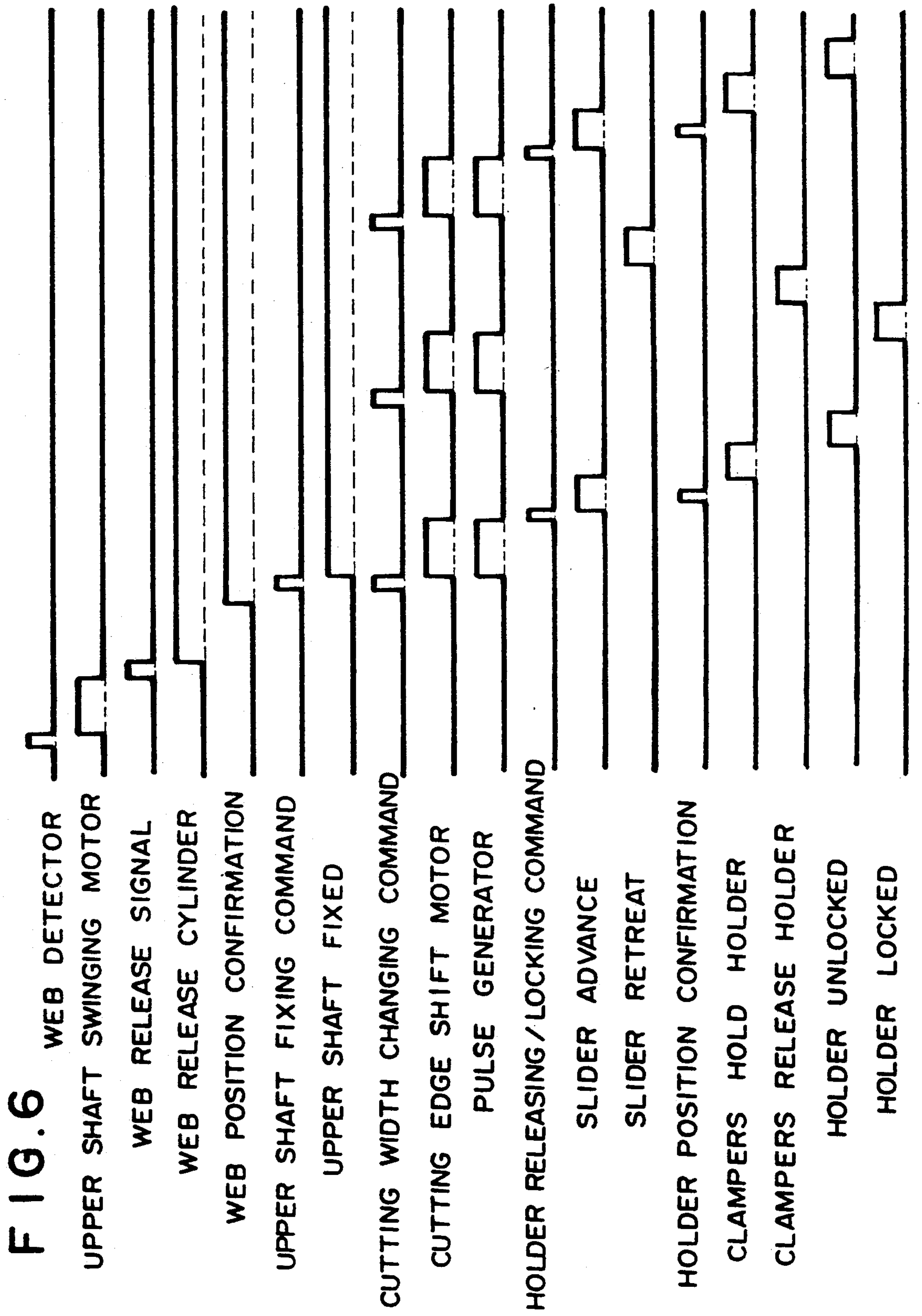
FIG. 6 shows the sequence of the operations accomplished to shift the upper slitting blade.

The operations described above are accomplished under the control of the slitter control system 108 and the slitting width control system 110 shown in FIG. 5. The sequence of the operations for the upper slitting blade 14U are shown in FIG. 6, and those for the lower slitting blade 14L are substantially the same.

As can be understood from the description above, in accordance with this embodiment, the upper slitting blade holder 62U and the lower slitting blade holder 62L can be locked respectively on the upper shaft 12U and the lower shaft 12L with a proper locking force since the holders 62U and 62L are locked by rotating them relative to the shafts 12U and 12L.

Further in this particular embodiment, the lower slitting blade 14L and the collar 68 support the wide strip-like web W at substantially the same height, the slitting width accuracy is further improved, and the lower slitting blade 14L can be protected from damage (e.g., fracture).

Further, since the upper slitting blade 14U and the lower slitting blade 14L are incorporated into a slitting blade unit 36, the slitting blades can be easily changed in a short time.

Further, since the wide strip-like web W is automatically removed from the slitting blades by the web release cylinders when the slitting width is to be changed, labor can be saved.

Although, in the embodiment described above, the upper and lower slitting blade holders 62U and 62L are rotated to lock them on the shafts 12U and 12L and releases them from the same by the use of gears, other mechanisms such as friction rings or rotating clampers may be used instead of the gears.

Although, in the embodiment described, powder clutches 104 are used in order to limit the locking torque, hysteresis clutches, torque limiters or the like may also be used.

Finally, in the embodiment described above, although the present invention is applied to the slitter 10 having the upper and lower slitting blades 14U and 14L, the present invention can also be applied to a slitter having only an upper slitting blade (e.g., a force-cutting blade).

We claim:

1. A slitting width changing system for a slitter in which a wide web is slit into narrow strips by at least one slitting blade mounted on a shaft member which extends in the transverse direction of the wide web while the wide web is fed in the longitudinal direction thereof, said slitting width changing system comprising:

a slitting blade holder which holds said slitting blade and is fitted on said shaft member to be rotatable about the shaft member between a released position in which said slitting blade holder is slid along the shaft member in the longitudinal direction of the shaft member and a locked position in which said slitting blade holder is fixed to the shaft member not to slide along the shaft member, said slitting blade holder comprising an annular member having an eccentric groove, and an eccentric ring which has ann inner diameter slightly larger than that of said shaft member and is fitted within said eccentric groove, and a slitting blade shift mechanism which rotates the slitting blade holder to the released position, slides said slitting blade holder along the shaft member to a position determined according to a desired slitting width, and rotates said slitting blade holder to the locked position.

2. A slitting width changing system as defined in claim 1, wherein said slitting blade holder further comprises a plurality of balls interposed between said eccentric ring and said annular member, the eccentric ring exerting no force on said shaft member and permitting the slitting blade holder to slide along the shaft member when the eccentric ring and the slitting blade holder are positioned relative to each other so that a space between an outer peripheral surface of the eccentric ring and a surface of the annular member is substantially uniform over the entire circumference, and said eccentric ring exerting a clamping force on said shaft member and fixing the slitting blade holder to the shaft member when the slitting blade holder is rotated to a position where the space between the outer peripheral surface of the eccentric ring and said surface of the annular member of the slitting blade holder is non-uniform.

3. A slitting width changing system as defined in claim 2, in which said eccentric ring is provided with a slit at a portion where the radial thickness thereof is minimum.

* * * * *